(12) United States Patent
Chiang et al.

(10) Patent No.: US 8,744,464 B2
(45) Date of Patent: Jun. 3, 2014

(54) INTERFERENCE COORDINATION IN HETEROGENEOUS NETWORKS

(75) Inventors: David Chiang, Fremont, CA (US); Lalit R. Kotecha, San Ramon, CA (US); Jay J. Lee, San Ramon, CA (US); Patricia R. Chang, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 10 days.

(21) Appl. No.: 13/611,884

(22) Filed: Sep. 12, 2012

(65) Prior Publication Data
US 2014/0073334 A1 Mar. 13, 2014

(51) Int. Cl.
*H04W 72/00* (2009.01)

(52) U.S. Cl.
USPC ........... 455/450; 455/443; 455/444; 455/448; 455/449

(58) Field of Classification Search
USPC .......................... 455/450, 443–444, 448–449
See application file for complete search history.

(56) References Cited

U.S. PATENT DOCUMENTS

| | | | |
|---|---|---|---|
| 8,285,293 B2* | 10/2012 | Claussen et al. | 455/446 |
| 2010/0216486 A1* | 8/2010 | Kwon et al. | 455/452.2 |
| 2010/0265867 A1* | 10/2010 | Becker et al. | 370/312 |
| 2010/0278141 A1* | 11/2010 | Choi-Grogan et al. | 370/331 |
| 2011/0013600 A1* | 1/2011 | Kim et al. | 370/332 |
| 2011/0051686 A1* | 3/2011 | Lee et al. | 370/331 |
| 2011/0151886 A1* | 6/2011 | Grayson et al. | 455/452.1 |
| 2011/0300855 A1* | 12/2011 | Zhou et al. | 455/422.1 |
| 2012/0069803 A1* | 3/2012 | Iwamura et al. | 370/329 |
| 2012/0094666 A1* | 4/2012 | Awoniyi et al. | 455/435.1 |
| 2012/0108255 A1* | 5/2012 | Jo et al. | 455/450 |
| 2012/0127954 A1* | 5/2012 | Lim et al. | 370/330 |
| 2012/0129536 A1* | 5/2012 | Zou et al. | 455/444 |
| 2012/0135743 A1* | 5/2012 | Ebiko et al. | 455/452.2 |
| 2012/0178454 A1* | 7/2012 | Kim et al. | 455/436 |
| 2012/0190365 A1* | 7/2012 | Jeong et al. | 455/436 |
| 2013/0029660 A1* | 1/2013 | Deshpande | 455/426.1 |

* cited by examiner

*Primary Examiner* — Jinsong Hu
*Assistant Examiner* — Qun Shen

(57) ABSTRACT

A device establishes a connection with a user equipment (UE) via a macrocell associated with the device, and provides, to a femto device within range of the macrocell, information identifying resource blocks to allocate to the UE when the UE enters into a femtocell generated by the femto device. The femto device provides the information to the UE when the UE enters into the femtocell. The device also maintains the connection of the UE with macrocell, via the allocated resource blocks identified in the information, when the UE enters into the femtocell.

17 Claims, 10 Drawing Sheets

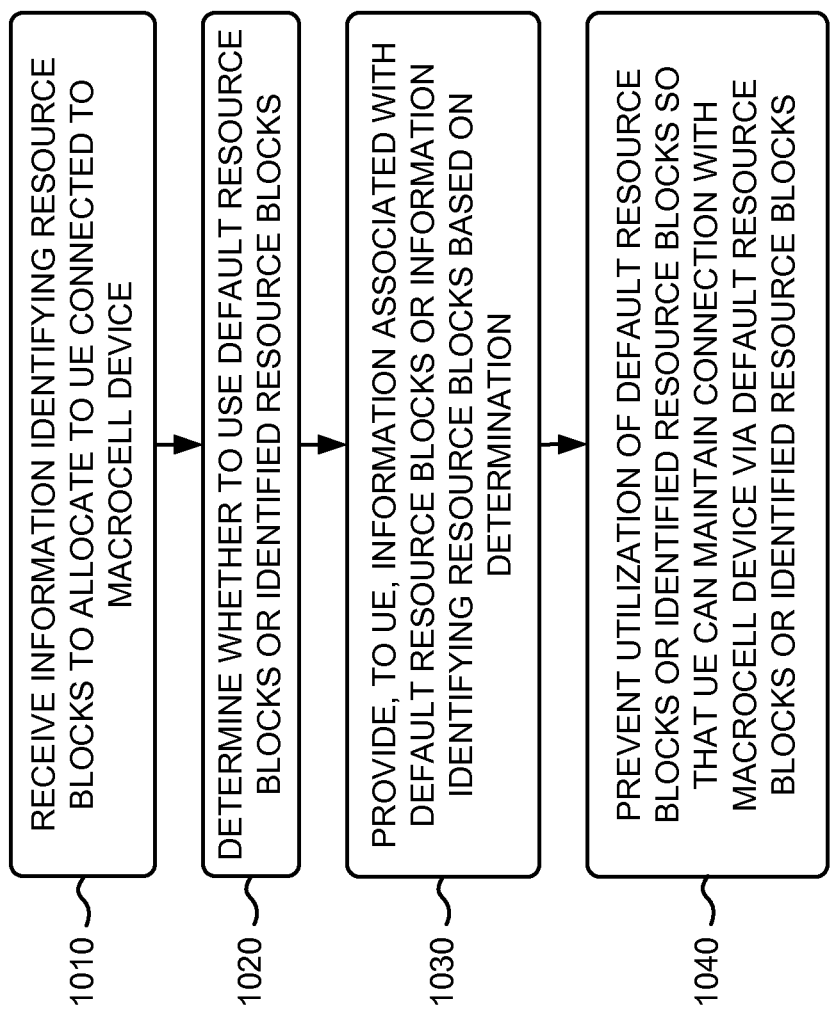

INTERFERENCE COORDINATION IN HETEROGENEOUS NETWORKS

BACKGROUND

A femtocell is generated by a small cellular base station that connects to a service provider network via broadband. A femtocell typically supports two to four mobile communication devices (e.g., user equipment (UE)) in a residential setting and eight to sixteen UEs in a business setting.

A macrocell is maintained by a macro network that may include a Long Term Evolution (LTE) network, an evolved high rate packet data (eHRPD) network, mixed LTE/eHRPD networks, etc. For example, a macrocell may be generated by a base station, an eNodeB (eNB), etc. A macrocell typically supports multiple UEs and may overlap with one or more femtocells. A network that includes a macrocell overlapping with one or more femtocells may be referred to as a heterogeneous network.

When a UE is connected to a macrocell and enters into a range of a femtocell, the UE may lose connectivity with the macrocell due to the femtocell being locked in a closed subscriber group mode of which the UE is not a member. In which case, the femtocell will not grant access/handoff to the UE, and will create interference for the UE. For example, the femtocell may utilize particular resource blocks (e.g., time slots, frequency slots, bandwidth, etc.), to connect with and/or communicate with the UE. The particular resource blocks may be the same resource blocks utilized by the UE to connect with and/or communicate with the macrocell. Thus, the femtocell may interfere with the UE's connection with the macrocell, and the UE may lose connectivity with the macrocell.

BRIEF DESCRIPTION OF THE DRAWINGS

FIG. 10 is a flow chart of an example process for coordinating interference in a heterogeneous network via a femtocell device.

DETAILED DESCRIPTION OF PREFERRED EMBODIMENTS

The following detailed description refers to the accompanying drawings. The same reference numbers in different drawings may identify the same or similar elements.

Figure 1:
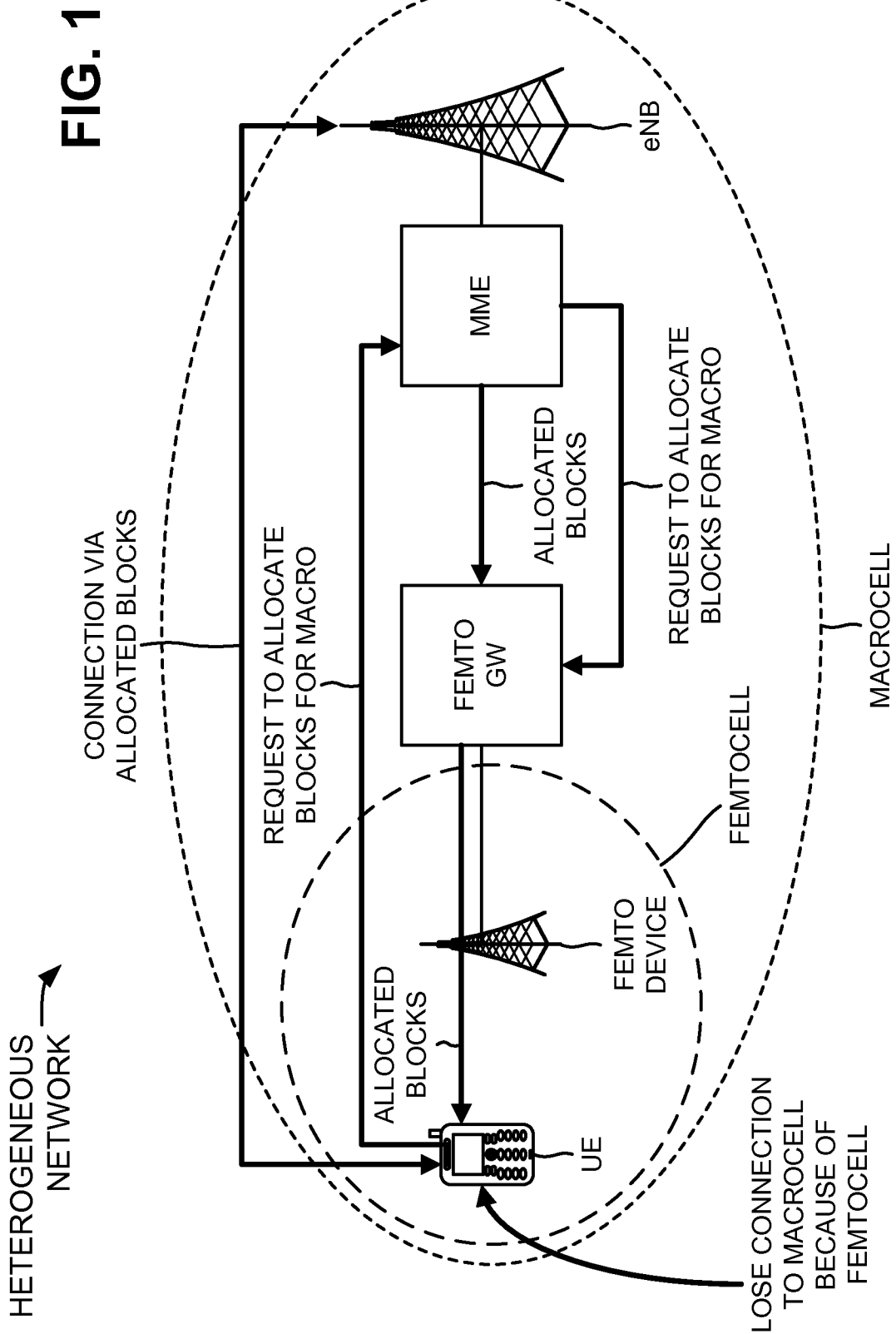
FIG. 1 is a diagram of an overview of an example implementation described herein.

Systems and/or methods described herein may provide intelligent interference coordination in a heterogeneous network so that a UE may maintain a connection with a macrocell even when the UE enters into a femtocell. FIG. 1 is a diagram of an overview of an example implementation described herein. As shown, a heterogeneous network may include a UE, a femto device, a femto gateway (GW), a femtocell (e.g., generated by the femto device), a mobility management entity (MME), an eNodeB (eNB), and a macrocell (e.g., generated by the eNB).

The UE may include a radiotelephone, a personal communications system (PCS) terminal, a smart phone, a personal digital assistant (PDA), a laptop computer, a tablet computer, or other types of mobile communication devices. The femto device may include a small cellular base station designed for use in a home or a small business. The femto device may connect to a service provider network via broadband and may generate the femtocell. The femtocell may support fewer UEs in a residential setting and more UEs in a business setting. The femto gateway may include a traffic transfer device (or network device), such as a gateway, a router, a switch, or some other type of device that processes and/or transfers traffic. The femto gateway may connect and/or communication with one or more femto devices, and may connect and/or communicate with the MME.

The MME may include one or more computation and communication devices that may be responsible for idle mode tracking and paging procedures (e.g., including retransmissions) for the UE. The MME may be involved in a bearer activation and deactivation process, and may connect and/or communicate with the femto gateway and the eNB. The eNB may include one or more computation and communication devices that may receive traffic (e.g., voice, data, etc.) from the MME and may transmit the traffic to the UE via an air interface (e.g., the macrocell). The eNB may also receive traffic from the UE over an air interface and may transmit the traffic to the MME or to other UEs. The eNB may generate the macrocell. The macrocell may support multiple UEs, and may, as shown in FIG. 1, overlap with the femtocell.

In one example, it may be assumed that the UE is connected to the eNB (e.g., the macrocell) when the UE enters into the femtocell. As described above, in such a scenario, the UE may lose the connection with the macrocell due to the femtocell utilizing the same resource blocks utilized by the UE to connect with and/or communicate with the macrocell. In another example, the UE may attempt an active handoff to the femtocell but is rejected because the femtocell is locked in a closed subscriber group mode of which the UE is not a member. In such a scenario, the UE may be unable to idle handoff, via cell reselection from the macrocell, to the femtocell because the femtocell is locked in the closed subscriber group mode of which the UE is not a member.

However, in implementations described herein, when the UE detects the presence of the femtocell, the UE may provide, to the MME, a request to allocate resource blocks for the UE. The resource blocks may include particular time slots, particular frequency slots, particular bandwidths, particular bitrates, etc. that the UE may utilize to maintain the connection with the macrocell while the UE remains in the femtocell.

The MME may receive the request to allocate resource blocks from the UE, and may determine what resource blocks to allocate to the UE based on the request. The allocated resource blocks may include resource blocks that the UE may utilize to maintain the connection with the macrocell while the UE remains in the femtocell. The MME may provide information identifying the allocated resource blocks to the femto gateway, and the femto gateway may receive the information identifying the allocated resource blocks. The femto gateway may forward the information identifying the allocated resource blocks to the UE, via the femto device. The UE may receive the information identifying the allocated resource blocks, and may maintain the connection with the macrocell, via the eNB and the allocated resource blocks. The UE may maintain the connection with the macrocell while the UE remains present in the femtocell. The femto device may not utilize the allocated resource blocks so that the UE may maintain the connection with the macrocell via the allocated resource blocks.

Alternatively, or additionally, the MME may provide, to the femto gateway (or directly to the femto device), a request to allocate resource blocks for the UE. The MME may provide the request to the femto gateway (or the femto device) prior to when the UE enters the femtocell or when the UE enters the femtocell. The femto gateway (or the femto device) may receive the request to allocate resource blocks from the MME, and may determine whether to use default resource blocks or the requested resource blocks. The default resource blocks and/or the requested resource blocks may include resource blocks that the UE may utilize to maintain or establish a connection with the macrocell while the UE is located in the femtocell. The femto gateway (or the femto device) may forward information identifying the default resource blocks or the requested resource blocks to the UE. The UE may receive the information identifying the default resource blocks or the requested resource blocks, and may maintain or establish the connection with the macrocell, via the eNB and the default resource blocks or the requested resource blocks. The UE may maintain the connection with the macrocell while the UE remains present in the femtocell. The femto device may not utilize the default resource blocks or the requested resource blocks so that the UE may maintain the connection with the macrocell.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 2:
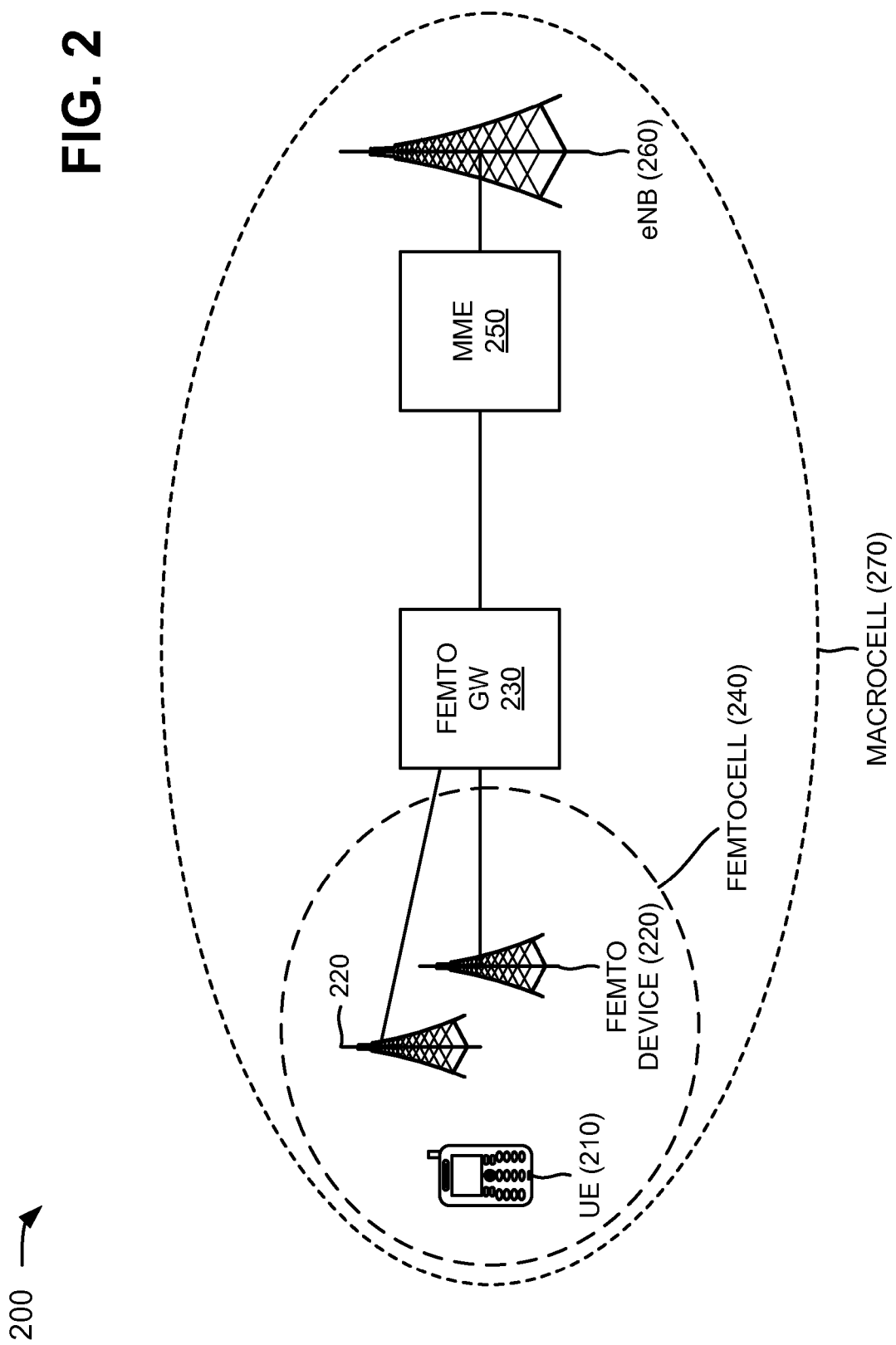
FIG. 2 is a diagram of an example network in which systems and/or methods described herein may be implemented.

FIG. 2 is a diagram of an example network 200 in which systems and/or methods described herein may be implemented. As illustrated, network 200 may include a UE 210, femto devices 220, a femto gateway 230, a femtocell 240 (e.g., generated by one of femto devices 220), a MME 250, an eNB 260, and a macrocell 270 (e.g., generated by eNB 260). Devices of network 200 may interconnect via wired and/or wireless connections or links. A single UE 210, two femto devices 220, a single femto gateway 230, a single femtocell 240, a single MME 250, a single eNB 260, and a single macrocell 270 have been illustrated in FIG. 2 for simplicity. In practice, there may be more UEs 210, femto devices 220, femto gateways 230, femtocells 240, MMEs 250, eNBs 260, and/or macrocells 270.

UE 210 may include a radiotelephone, a PCS terminal (e.g., that may combine a cellular radiotelephone with data processing and data communications capabilities), a smart phone, a PDA (e.g., that can include a radiotelephone, a pager, Internet/intranet access, etc.), a laptop computer (e.g., with a broadband air card), a tablet computer, a machine-to-machine (M2M) device, or other types of mobile communication devices. In an example implementation, UE 210 may include a mobile communication device that is capable of communicating with and/or connecting with femtocell 240 and/or macrocell 270.

Femto device 220 may include a cellular base station designed for use in a home or a small business. The cellular base station may be small relative to traditional cellular base stations. Femto device 220 may generate femtocell 240. Femtocell 240 may include a short range wireless coverage area that may permit service providers to extend service coverage indoors, especially where access would otherwise be limited or unavailable. Femto device 220 may receive traffic (e.g., voice, data, etc.) from a service provider network or femto gateway 230, and may transmit that traffic to UE 210 via an air interface (e.g., femtocell 240). Femto device 220 may also receive traffic from UE 210 over an air interface (e.g., femtocell 240), and may transmit that traffic to the service provider network, femto gateway 230, or other UEs.

Femto gateway 230 may include a traffic transfer device (or network device), such as a gateway, a router, a switch, a firewall, a network interface card (NIC), a hub, a bridge, a proxy server, an optical add-drop multiplexer (OADM), or some other type of device that processes and/or transfers traffic. In an example implementation, femto gateway 230 may receive traffic from femto devices 220, and may transmit that traffic to MME 250. Femto gateway 230 may also receive traffic from MME 250, and may transmit that traffic to femto devices 220. In one example implementation, femto gateway 230 may be omitted, and MME 250 may directly connect with and/or communicate with femto devices 220.

MME 250 may include one or more computation and communication devices that may be responsible for idle mode tracking and paging procedures (e.g., including retransmissions) for UE 210. MME 250 may be involved in a bearer activation and deactivation process and may choose a serving gateway (SGW) (not shown in FIG. 2) for UE 210 at an initial attach and at a time of intra-access network handover. MME 250 may authenticate UE 210. Non-access stratum (NAS) signaling may terminate at MME 250, and MME 250 may generate and allocate temporary identities to UE 210. MME 250 may check authorization of UE 210 to camp on a service provider's Public Land Mobile Network (PLMN) and may enforce roaming restrictions for UE 210. MME 250 may provide a control plane function for mobility between various access networks.

eNB 260 may include one or more computation and communication devices that may receive traffic from a SGW (not shown in FIG. 2), and may transmit that traffic to UE 210 via an air interface (e.g., macrocell 270). eNB 260 may also receive traffic from UE 210 over an air interface (e.g., macrocell 270), and may transmit that traffic to the SGW or other UEs. eNB 260 may generate macrocell 270. Macrocell 270 may include a long range wireless coverage area for multiple UEs 210. In one example, macrocell 270 may correspond to a LTE wireless coverage area, an eHRPD wireless coverage area, a mixed LTE/eHRPD wireless coverage area, etc.

Although FIG. 2 shows example devices of network 200, in other implementations, network 200 may include fewer devices, different devices, differently arranged devices, or additional devices than depicted in FIG. 2. Alternatively, or additionally, one or more devices of network 200 may perform one or more tasks described as being performed by one or more other devices of network 200.

Figure 3:
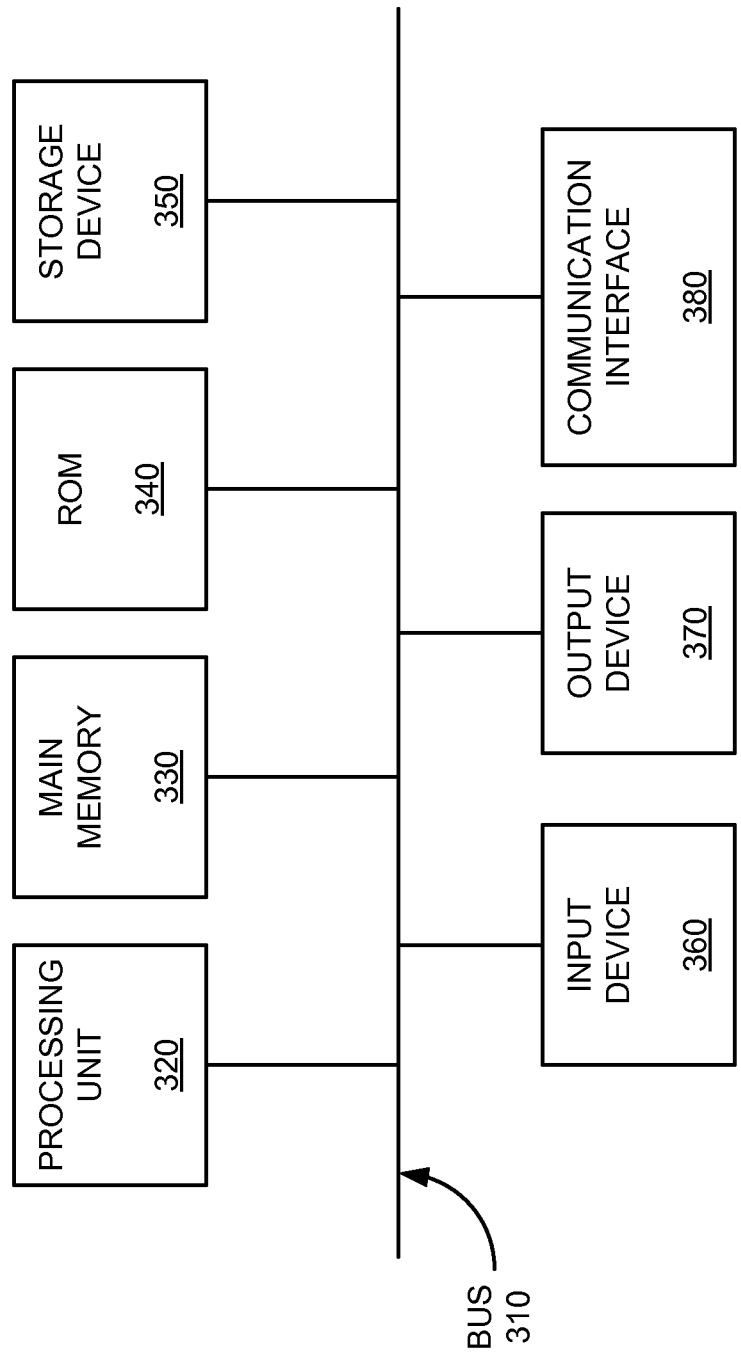
FIG. 3 is a diagram of example components of one or more devices of the network illustrated in FIG. 2.

FIG. 3 is a diagram of example components of a device 300 that may correspond to one or more devices of network 200. In one example implementation, one or more of the devices of network 200 may include one or more devices 300 or one or more components of device 300. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
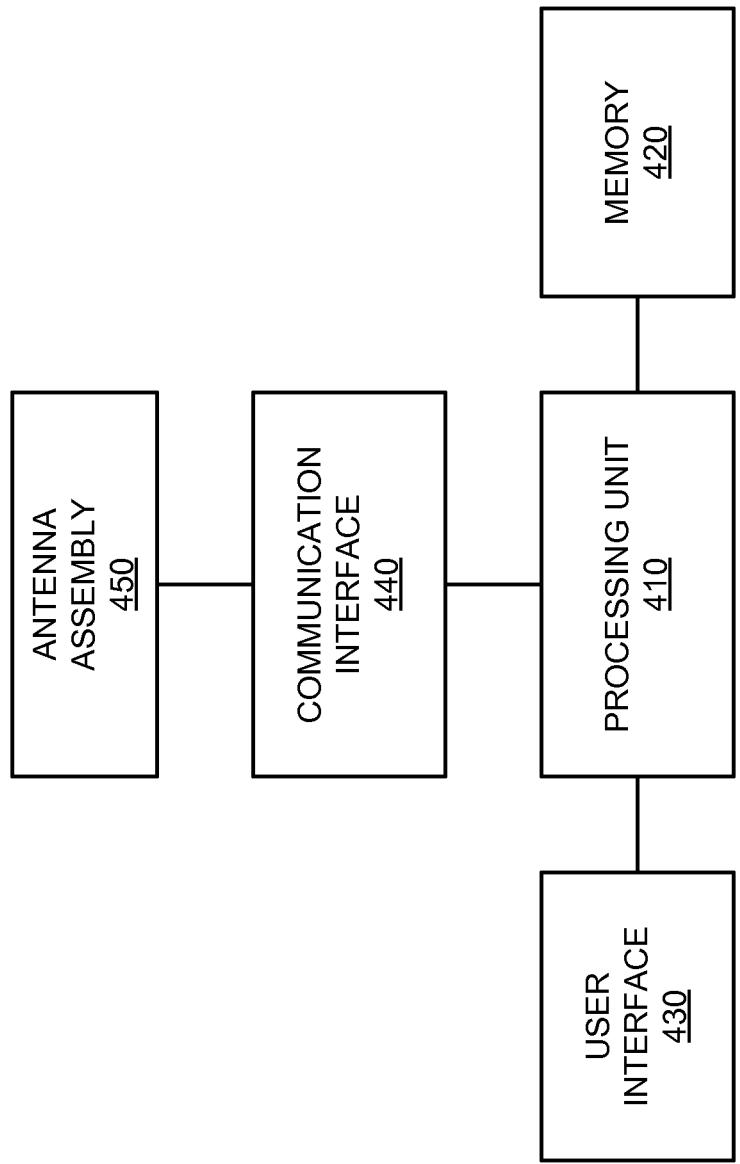
FIG. 4 is a diagram of example components of a user equipment of the network depicted in FIG. 2.

FIG. 4 is a diagram of example components of a device 400 that may correspond to, for example, UE 210. In one example implementation, UE 210 may include one or more devices 400 or one or more components of device 400. As illustrated, device 400 may include a processing unit 410, memory 420, a user interface 430, a communication interface 440, and/or an antenna assembly 450.

Processing unit 410 may include one or more processors, microprocessors, ASICs, FPGAs, or the like. Processing unit 410 may control operation of device 400 and its components. In one implementation, processing unit 410 may control operation of components of device 300 in a manner described herein.

Memory 420 may include a RAM, a ROM, and/or another type of memory to store data and instructions that may be used by processing unit 410.

User interface 430 may include mechanisms for inputting information to device 400 and/or for outputting information from device 400. Examples of input and output mechanisms might include buttons (e.g., control buttons, keys of a keypad, a joystick, etc.) or a touch screen interface to permit data and control commands to be input into device 400; a speaker to receive electrical signals and output audio signals; a microphone to receive audio signals and output electrical signals; a display to output visual information (e.g., text input into device 400); and/or a vibrator to causer equipment 400 to vibrate.

Communication interface 440 may include, for example, a transmitter that may convert baseband signals from processing unit 410 to radio frequency (RF) signals and/or a receiver that may convert RF signals to baseband signals. Alternatively, communication interface 440 may include a transceiver to perform functions of both a transmitter and a receiver. Communication interface 440 may connect to antenna assembly 450 for transmission and/or reception of the RF signals.

Antenna assembly 450 may include one or more antennas to transmit and/or receive RF signals over the air. Antenna assembly 450 may, for example, receive RF signals from communication interface 440 and transmit them over the air, and receive RF signals over the air and provide them to communication interface 440. In one implementation, for example, communication interface 440 may communicate with a network and/or devices connected to a network.

As will be described in detail below, device 400 may perform certain operations described herein in response to processing unit 410 executing software instructions of an application contained in a computer-readable medium, such as memory 420. The software instructions may be read into memory 420 from another computer-readable medium or from another device via communication interface 440. The software instructions contained in memory 420 may cause processing unit 410 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may include fewer components, different components, differently arranged components, or additional components than depicted in FIG. 4. Alternatively, or additionally, one or more components of device 400 may perform one or more other tasks described as being performed by one or more other components of device 400.

Figure 5:
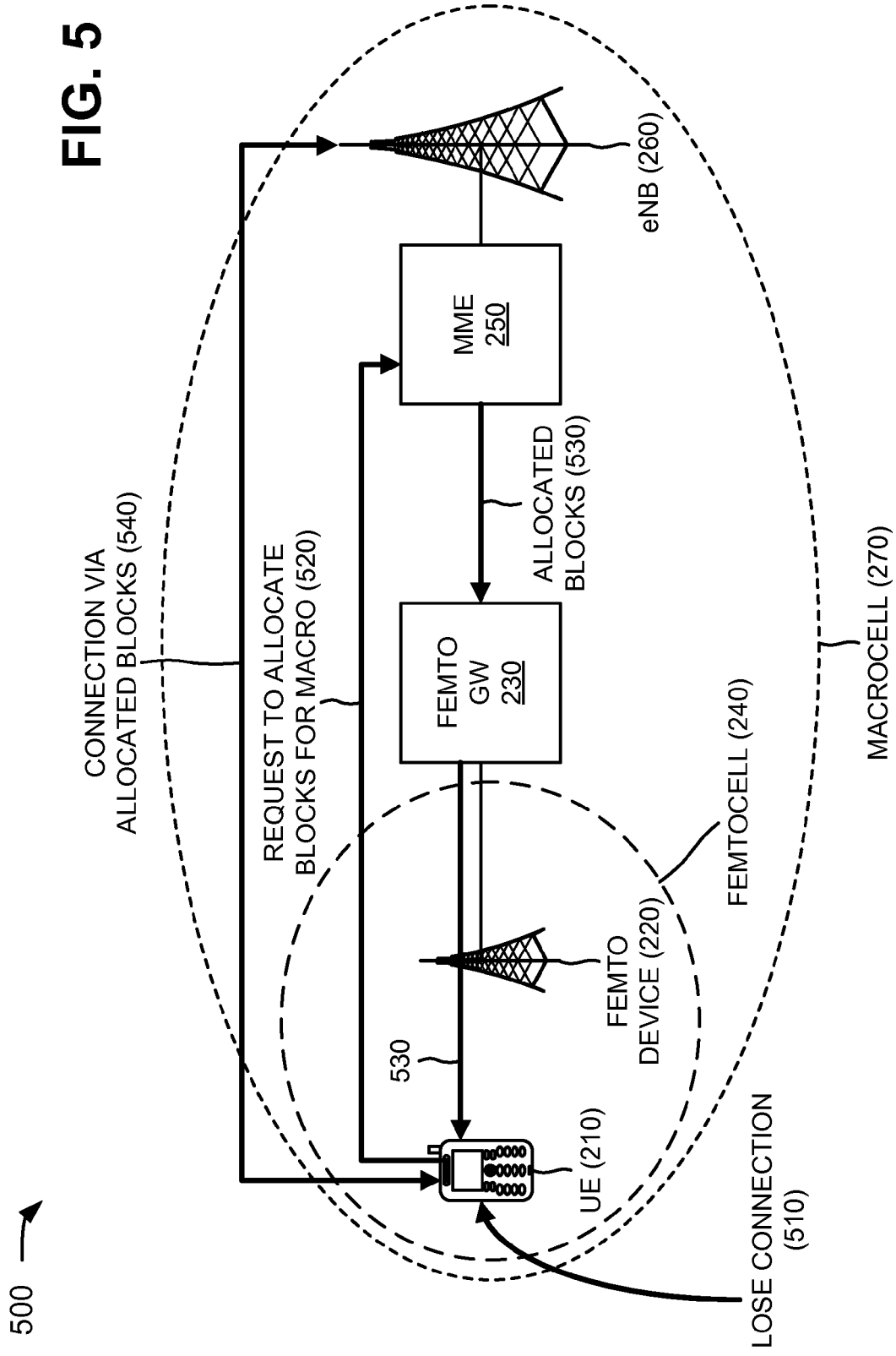
FIG. 5 is a diagram of example operations capable of being performed by an example portion of the network illustrated in FIG. 2.

FIG. 5 is a diagram of example operations capable of being performed by an example portion 500 of network 200 (FIG. 2). As shown in FIG. 5, network portion 500 may include UE 210, femto device 220, femto gateway 230, femtocell 240, MME 250, eNB 260, and macrocell 270. UE 210, femto device 220, femto gateway 230, femtocell 240, MME 250, eNB 260, and macrocell 270 may include the features described above in connection with one or more of, for example, FIGS. 1-4.

As further shown in FIG. 5, it may be assumed that UE 210 is connected to eNB 260 (e.g., macrocell 270) when UE enters into femtocell 240. The connection with UE 210 may be established by eNB 260 via cooperation with MME 250. In such a scenario, UE 210 may lose the connection with macrocell 270, as indicated by reference number 510, due to femtocell 240 utilizing the same resource blocks utilized by UE 210 to connect with and/or communicate with macrocell 270. In one example, UE 210 may determine that UE 210 may lose the connection with macrocell 270 when UE 210 detects strong signals from femtocell 240. In order to prevent losing the connection with macrocell 270, UE 210 may provide, to MME 250 and when UE 210 detects the presence of femtocell 240, a request 520 to allocate resource blocks for UE 210. The resource blocks may include particular time slots, particular frequency slots, particular bandwidths, particular bitrates, etc. that UE 210 may utilize to maintain the connection with macrocell 270 while UE 210 remains in femtocell 240.

MME 250 may receive request 520 to allocate resource blocks from UE 210, and may determine what resource blocks to allocate to UE 210 based on request 520. The allocated resource blocks may include resource blocks that UE 210 may utilize to maintain the connection with macrocell 270 while UE 210 remains in femtocell 240. MME 250 may provide information 530 identifying the allocated resource blocks to femto gateway 230 (or directly to femto device 220), and femto gateway 230 (or femto device 220) may receive information 530 identifying the allocated resource blocks. In one example, MME 250 may provide information 530 to femto device 220/femto gateway 230 via a variety of messages, such as a Session Initiation Protocol (SIP) over the air (OTA) message, an X2 link message, an Internet protocol (IP) link on the control plane message, etc. Alternatively, or additionally, MME 250 may provide information 530 to femto device 220/femto gateway 230 via UE 210. In such a scenario, UE 210 may act as a relay to broker resource blocks between femtocell 240 and macrocell 270. UE 210 may request resource blocks directly from femto device 220 and/or from femto gateway 230, or UE 210 may request resource blocks from MME 250, as shown in FIG. 5.

Femto gateway 230 may forward information 530 identifying the allocated resource blocks to UE 210, via femto device 220. UE 210 may receive information 530 identifying the allocated resource blocks, and may maintain the connection with macrocell 270, via eNB 260 and the allocated resource blocks, as indicated by reference number 540. UE 210 may maintain the connection with macrocell 270 while UE 210 remains present in femtocell 240. Femto device 220 may not utilize the allocated resource blocks so that UE 210 may maintain the connection with macrocell 270 via the allocated resource blocks.

In one example, femto device 220 may not utilize (i.e., may free up) a portion of the frequency or time domain resource blocks of femtocell 240 so that UE 210 may maintain the connection with macrocell 270. Alternatively, or additionally, femto device 220 may not utilize time slots requested by MME 250 (e.g., via request 520), may not utilize bandwidth requested by MME 250, may manipulate automatic gain control (AGC), etc. so that UE 210 may maintain the connection with macrocell 270. Alternatively, or additionally, if UE 210 is utilizing a high bandwidth application that cannot be adequately served by the allocated resource blocks, the bandwidth utilized by UE 210 for the application may need to be reduced to fit within the allocated resource blocks. When UE 210 leaves femtocell 240, femto device 220 may once again utilize the allocated resource blocks, and UE 210 may utilize resource blocks, other than the allocated resource blocks, to communicate with macrocell 270.

Although FIG. 5 shows example components of network portion 500, in other implementations, network portion 500 may include fewer components, different components, differently arranged components, or additional components than depicted in FIG. 5. Alternatively, or additionally, one or more components of network portion 500 may perform one or more other tasks described as being performed by one or more other components of network portion 500.

Figure 6:
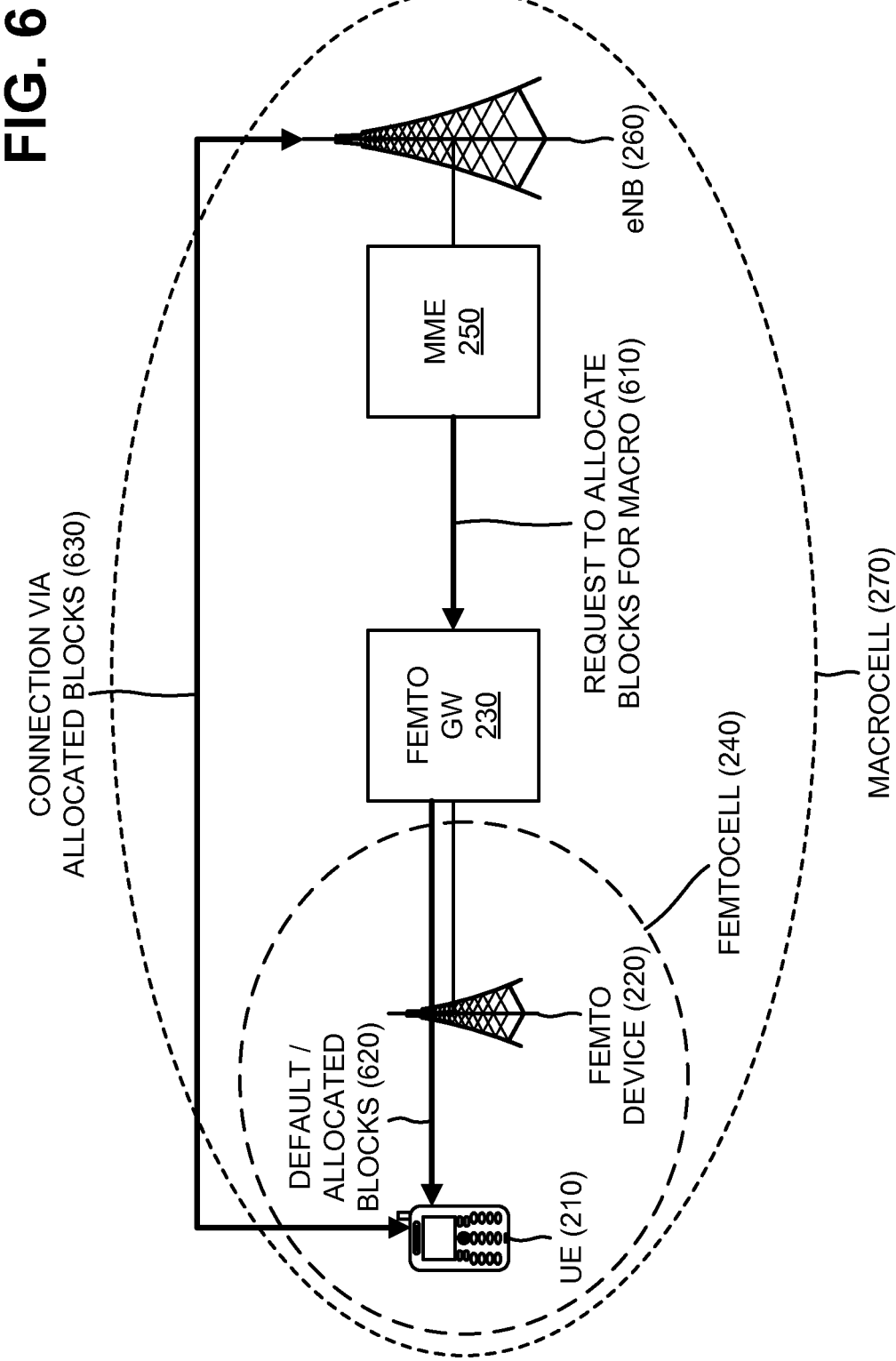
FIG. 6 is a diagram of example operations capable of being performed by another example portion of the network illustrated in FIG. 2.

FIG. 6 is a diagram of example operations capable of being performed by another example portion 600 of network 200 (FIG. 2). As shown in FIG. 6, network portion 600 may include UE 210, femto device 220, femto gateway 230, femtocell 240, MME 250, eNB 260, and macrocell 270. UE 210, femto device 220, femto gateway 230, femtocell 240, MME 250, eNB 260, and macrocell 270 may include the features described above in connection with one or more of, for example, FIGS. 1-5.

It may be assumed that UE 210 is connected to eNB 260, via macrocell 270. The connection with UE 210 may be established by eNB 260 via cooperation with MME 250. As further shown in FIG. 6, MME 250 may provide, to femto gateway 230 (or directly to one or more femto devices 220 within range of macrocell 270), a request 610 to allocate resource blocks for UE 210. MME 250 may provide request 610 to femto gateway 230 (or femto device 220) prior to when UE 210 enters femtocell 240 or when UE 210 enters femtocell 240. Femto gateway 230 (or femto device 220) may receive request 610 to allocate resource blocks from MME 250, and may determine whether to use default resource blocks or the requested resource blocks. The default resource blocks and/or the requested resource blocks may include resource blocks that UE 210 may utilize to maintain or establish a connection with macrocell 270 while UE 210 is located in femtocell 240. In one example, the default resource blocks and/or the requested resource blocks may include particular time slots, particular frequency slots, particular bandwidths, particular bitrates, etc. that UE 210 may utilize to maintain the connection with macrocell 270 while UE 210 remains in femtocell 240. MME 250 may provide request 610 to femto device 220/femto gateway 230 via a variety of messages, such as a SIP OTA message, an X2 link message, an IP link on the control plane message, etc.

Femto gateway 230 and/or femto device 220 may forward information 620 identifying the default resource blocks or the requested resource blocks to UE 210. UE 210 may receive information 620 identifying the default resource blocks or the requested resource blocks, and may maintain or establish the connection with macrocell 270, via eNB 260 and the default resource blocks or the requested resource blocks. UE 210 may maintain the connection with macrocell 270 while UE 210 remains present in femtocell 240. While UE 210 is in femtocell 240, femto device 220 may not utilize the default resource blocks or the requested resource blocks so that UE 210 may maintain the connection with macrocell 270.

In one example, femto device 220 may not utilize (i.e., may free up) a portion of the frequency or time domain resource blocks of femtocell 240 so that UE 210 may maintain the connection with macrocell 270. Alternatively, or additionally, femto device 220 may not utilize time slots requested by MME 250 (e.g., via request 610), may not utilize bandwidth requested by MME 250, may manipulate AGC, etc. so that UE 210 may maintain the connection with macrocell 270. When UE 210 leaves femtocell 240, femto device 220 may once again utilize the default resource blocks or the requested resource blocks, and UE 210 may utilize resource blocks, other than the default resource blocks or the requested resource blocks, to communicate with macrocell 270.

Although FIG. 6 shows example components of network portion 600, in other implementations, network portion 600 may include fewer components, different components, differently arranged components, or additional components than depicted in FIG. 6. Alternatively, or additionally, one or more components of network portion 600 may perform one or more other tasks described as being performed by one or more other components of network portion 600.

Figure 7:
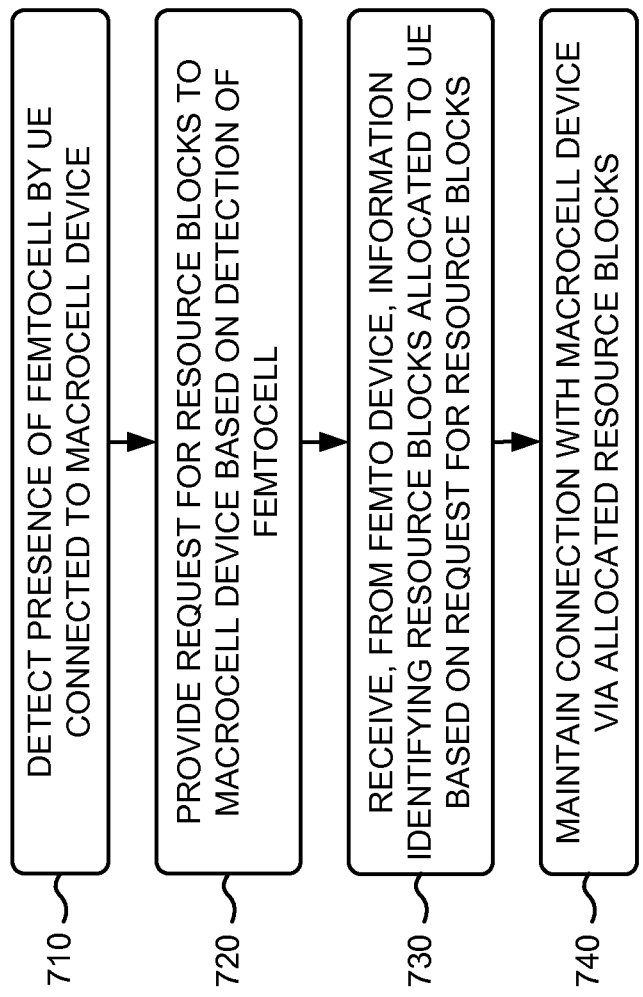
FIG. 7 is a flow chart of an example process for coordinating interference in a heterogeneous network via a UE.

FIG. 7 is a flow chart of an example process 700 for coordinating interference in a heterogeneous network via a UE. In one implementation, process 700 may be performed by UE 210. Alternatively, or additionally, some or all of process 700 may be performed by another device or group of devices, including or excluding UE 210.

As shown in FIG. 7, process 700 may include detecting a presence of a femtocell by a UE connected to a macrocell device (block 710), and providing a request for resource blocks to the macrocell device based on the detection of the femtocell (block 720). For example, in an implementation described above in connection with FIG. 5, UE 210 may determine that UE 210 may lose the connection with macrocell 270 when UE 210 detects strong signals from femtocell 240. In order to prevent losing the connection with macrocell 270, UE 210 may provide, to MME 250 and when UE 210 detects the presence of femtocell 240, request 520 to allocate resource blocks for UE 210. The resource blocks may include particular time slots, particular frequency slots, particular bandwidths, particular bitrates, etc. that UE 210 may utilize to maintain the connection with macrocell 270 while UE 210 remains in femtocell 240.

As further shown in FIG. 7, process 700 may include receiving, from a femto device, information identifying resource blocks allocated to UE based on the request for resource blocks (block 730). For example, in an implementation described above in connection with FIG. 5, MME 250 may receive request 520 to allocate resource blocks from UE 210, and may determine what resource blocks to allocate to UE 210 based on request 520. MME 250 may provide information 530 identifying the allocated resource blocks to femto gateway 230 (or directly to femto device 220). Femto gateway 230 may forward information 530 identifying the allocated resource blocks to UE 210, via femto device 220. UE 210 may receive information 530 identifying the allocated resource blocks.

Returning to FIG. 7, process 700 may include maintaining the connection with the macrocell via the allocated resource blocks (block 740). For example, in an implementation described above in connection with FIG. 5, UE 210 may receive information 530 identifying the allocated resource blocks, and may maintain the connection with macrocell 270, via eNB 260 and the allocated resource blocks, as indicated by reference number 540. UE 210 may maintain the connection with macrocell 270 while UE 210 remains present in femtocell 240. Femto device 220 may not utilize the allocated resource blocks so that UE 210 may maintain the connection with macrocell 270 via the allocated resource blocks.

Figure 8:
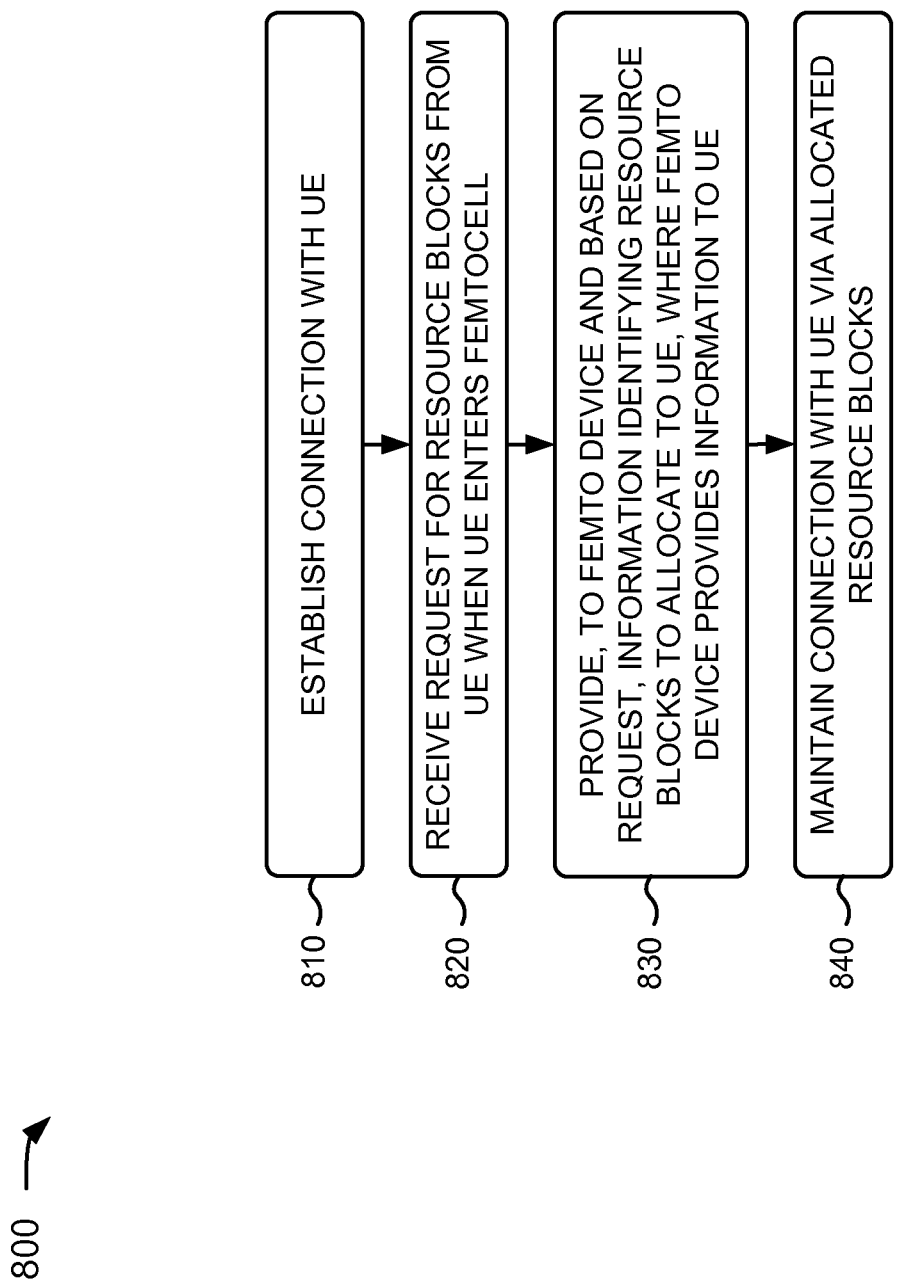
FIG. 8 is a flow chart of an example process for coordinating interference in a heterogeneous network via a macrocell device.

FIG. 8 is a flow chart of an example process 800 for coordinating interference in a heterogeneous network via a macrocell device. In one implementation, process 800 may be performed by MME 250. Alternatively, or additionally, some or all of process 800 may be performed by another device or group of devices (e.g., eNB 260), including or excluding MME 250.

As shown in FIG. 8, process 800 may include establishing a connection with a UE (block 810), and receiving a request for resource blocks from the UE when the UE enters a femtocell (block 820). For example, in an implementation described above in connection with FIG. 5, UE 210 may be connected to eNB 260 (e.g., macrocell 270) when UE enters into femtocell 240. In order to prevent losing the connection with macrocell 270, UE 210 may provide, to MME 250 and when UE 210 detects the presence of femtocell 240, request 520 to allocate resource blocks for UE 210. The resource blocks may include particular time slots, particular frequency slots, particular bandwidths, particular bitrates, etc. that UE 210 may utilize to maintain the connection with macrocell 270 while UE 210 remains in femtocell 240. MME 250 may receive request 520 to allocate resource blocks from UE 210.

As further shown in FIG. 8, process 800 may include providing, to a femto device and based on the request, information identifying resource blocks to allocate to the UE, where the femto device provides the information to the UE (block 830). For example, in an implementation described above in connection with FIG. 5, MME 250 may determine what resource blocks to allocate to UE 210 based on request 520. The allocated resource blocks may include resource blocks that UE 210 may utilize to maintain the connection with macrocell 270 while UE 210 remains in femtocell 240. MME 250 may provide information 530 identifying the allocated resource blocks to femto gateway 230 (or directly to femto device 220). Femto gateway 230 may forward information 530 identifying the allocated resource blocks to UE 210, via femto device 220.

Returning to FIG. 8, process 800 may include maintaining the connection with the UE via the allocated resource blocks (block 840). For example, in an implementation described above in connection with FIG. 5, UE 210 may receive information 530 identifying the allocated resource blocks, and may maintain the connection with macrocell 270, via eNB 260 and the allocated resource blocks, as indicated by reference number 540. UE 210 may maintain the connection with macrocell 270 while UE 210 remains present in femtocell 240. Femto device 220 may not utilize the allocated resource blocks so that UE 210 may maintain the connection with macrocell 270 via the allocated resource blocks.

Figure 9:
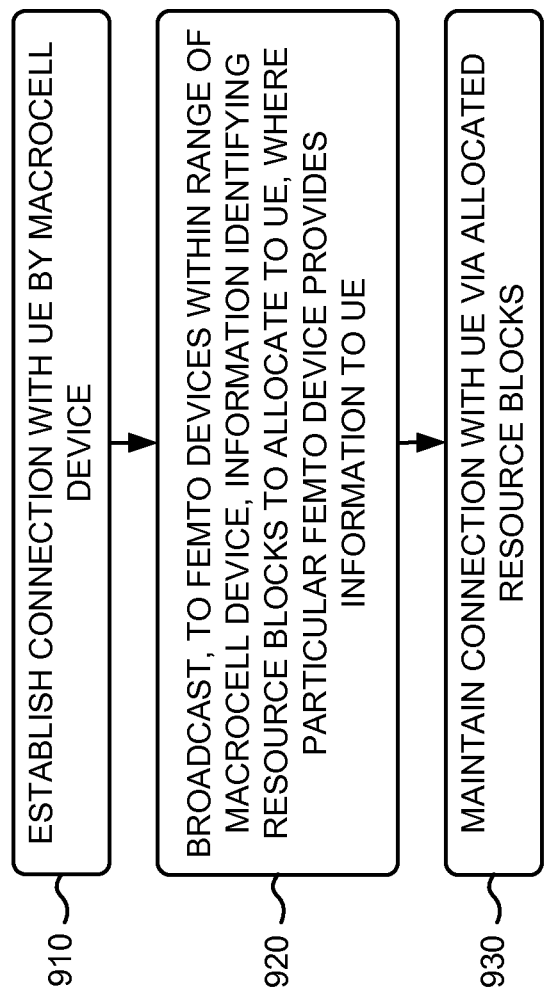
FIG. 9 is a flow chart of another example process for coordinating interference in a heterogeneous network via a macrocell device.

FIG. 9 is a flow chart of another example process 900 for coordinating interference in a heterogeneous network via a macrocell device. In one implementation, process 900 may be performed by MME 250. Alternatively, or additionally, some or all of process 900 may be performed by another device or group of devices (e.g., eNB 260), including or excluding MME 250.

As shown in FIG. 9, process 900 may include establishing a connection with a UE by a macrocell device (block 910), and broadcasting, to femto devices within range of the macrocell device, information identifying resource blocks to allocate to the UE, where a particular UE provides the information to the UE (block 920). For example, in an implementation described above in connection with FIG. 6, UE 210 may be connected to eNB 260, via macrocell 270. The connection with UE 210 may be established by eNB 260 via cooperation with MME 250. MME 250 may provide, to femto gateway 230 (or directly to one or more femto devices 220 within range of macrocell 270), request 610 to allocate resource blocks for UE 210. MME 250 may provide request 610 to femto gateway 230 (or femto device 220) prior to when UE 210 enters femtocell 240 or when UE 210 enters femtocell 240. Femto gateway 230 (or femto device 220) may receive request 610 to allocate resource blocks from MME 250, and may determine whether to use default resource blocks or the requested resource blocks. Femto gateway 230 and/or femto device 220 may forward information 620 identifying the default resource blocks or the requested resource blocks to UE 210.

As further shown in FIG. 9, process 900 may include maintaining the connection with the UE via the allocated resource blocks (block 930). For example, in an implementation described above in connection with FIG. 6, UE 210 may receive information 620 identifying the default resource blocks or the requested resource blocks, and may maintain or establish the connection with macrocell 270, via eNB 260 and the default resource blocks or the requested resource blocks. UE 210 may maintain the connection with macrocell 270 while UE 210 remains present in femtocell 240. While UE 210 is in femtocell 240, femto device 220 may not utilize the default resource blocks or the requested resource blocks so that UE 210 may maintain the connection with macrocell 270.

FIG. 10 is a flow chart of an example process 1000 for coordinating interference in a heterogeneous network via a femtocell device. In one implementation, process 1000 may be performed by femto device 220 or femto gateway 230. Alternatively, or additionally, some or all of process 1000 may be performed by another device or group of devices, including or excluding femto device 220 and/or femto gateway 230.

As shown in FIG. 10, process 1000 may include receiving information identifying resource blocks to allocate to a UE connected to a macrocell device (block 1010), and determining whether to use default resource blocks or the identified resource blocks (block 1020). For example, in an implementation described above in connection with FIG. 6, MME 250 may provide, to femto gateway 230 (or directly to one or more femto devices 220 within range of macrocell 270), request 610 to allocate resource blocks for UE 210. MME 250 may provide request 610 to femto gateway 230 (or femto device 220) prior to when UE 210 enters femtocell 240 or when UE 210 enters femtocell 240. Femto gateway 230 (or femto device 220) may receive request 610 to allocate resource blocks from MME 250, and may determine whether to use default resource blocks or the requested resource blocks. The default resource blocks and/or the requested resource blocks may include resource blocks that UE 210 may utilize to maintain or establish a connection with macrocell 270 while UE 210 is located in femtocell 240. In one example, the default resource blocks and/or the requested resource blocks may include particular time slots, particular frequency slots, particular bandwidths, particular bitrates, etc. that UE 210 may utilize to maintain the connection with macrocell 270 while UE 210 remains in femtocell 240.

As further shown in FIG. 10, process 1000 may include providing, to the UE, information associated with the default resource blocks or the information identifying the resource blocks based on the determination (block 1030). For example, in an implementation described above in connection with FIG. 6, femto gateway 230 and/or femto device 220 may forward information 620 identifying the default resource blocks or the requested resource blocks to UE 210, depending on whether femto gateway 230 and/or femto device 220 decides to utilize the default resource blocks or the requested resource blocks.

Returning to FIG. 10, process 1000 may include preventing or refraining from utilization of the default resource blocks or the identified resource blocks so that the UE can maintain the connection with the macrocell device via the default resource blocks or the identified resource blocks (block 1040). For example, in an implementation described above in connection with FIG. 6, while UE 210 is in femtocell 240, femto device 220 may not utilize the default resource blocks or the requested resource blocks so that UE 210 may maintain the connection with macrocell 270.

Systems and/or methods described herein may provide intelligent interference coordination in a heterogeneous network so that a UE may maintain a connection with a macrocell even when the UE enters into a femtocell.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the invention unless explicitly described as such. Also, as used herein, the articles "a" and "an" are intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   detecting, by a device, a presence of a femtocell generated by a femto device;
   determining, by the device, that the device is capable of losing a connection with a macrocell due to the femtocell using same first resource blocks that are utilized by the device for the connection with the macrocell;
   providing, by the device and to a mobility management entity (MME) associated with the macrocell, a request for second resource blocks, to be allocated to the device, based on determining that the device is capable of losing the connection with the macrocell;
   receiving, by the device and from the femto device, information identifying the second resource blocks allocated to the device,
      the information identifying the second resource blocks being received by the femto device from a femto gateway and being received by the femto gateway from the MME, and
      the information identifying the second resource blocks being received based on the request, and
      the second resource blocks not being utilized by the femto device while the device remains within the femtocell; and
   maintaining, by the device, the connection with the macrocell via the second resource blocks identified in the information identifying the second resource blocks,
      the connection with the macrocell being maintained by the device based on the second resource blocks while the device remains within the femtocell.

2. The method of claim 1, where the device comprises a user equipment (UE).

3. The method of claim 1, where the second resource blocks allocated to the device include at least one of:
particular time slots that the device may utilize to maintain the connection with the macrocell while the device remains in the femtocell,
particular frequency slots that the device may utilize to maintain the connection with the macrocell while the device remains in the femtocell,
particular bandwidths that the device may utilize to maintain the connection with the macrocell while the device remains in the femtocell, or
particular bitrates that the device may utilize to maintain the connection with the macrocell while the device remains in the femtocell.

4. The method of claim 1, further comprising:
utilizing the first resource blocks, when the device no longer detects the presence of the femtocell, to communicate with the macrocell.

5. A method comprising:
connecting, by a mobility management entity (MME), with a user equipment (UE) via a macrocell associated with the MME;
receiving, by the MME, a request from the UE when the UE detects a presence of a femtocell that utilizes same first resource blocks that the UE uses for a connection with the macrocell;
determining, by the MME and based on the request, to allocate second resource blocks to the UE for the UE to maintain the connection with the macrocell while the UE remains in the femtocell;
providing, by the MME and to a femto gateway, information identifying the second resource blocks,
the femto gateway providing the information identifying the second resource blocks to a femto device associated with the femtocell,
the femto device providing the information identifying the second resource blocks to the UE,
the second resource blocks not being utilized by the femto device while the device remains in the femtocell; and
maintaining, by the MME, the connection with the UE via the macrocell based on the second resource blocks.

6. The method of claim 5, where the second resource blocks include at least one of:
particular time slots that the UE may utilize to maintain the connection with the macrocell while the UE remains in the femtocell,
particular frequency slots that the UE may utilize to maintain the connection with the macrocell while the UE remains in the femtocell,
particular bandwidths that the UE may utilize to maintain the connection with the macrocell while the UE remains in the femtocell, or
particular bitrates that the UE may utilize to maintain the connection with the macrocell while the UE remains in the femtocell.

7. The method of claim 5, where the information identifying the second resource blocks is included in at least one of:
a Session Initiation Protocol (SIP) over the air (OTA) message,
an X2 link message, or
an Internet protocol (IP) link on the control plane message.

8. A device comprising:
a processor to:
detect a presence of a femtocell associated with a femto device,
determine that the device is able to lose a connection with a macrocell due to the femtocell using same first resource blocks that are utilized by the device for the connection with the macrocell;
provide, to a mobility management entity (MME) associated with the macrocell, a request for second resource blocks, to be allocated to the device, based on determining that the device is able to lose the connection with the macrocell,
receive, from the femto device, information identifying the second resource blocks that are determined to be allocated to the device,
the information identifying the second resource blocks being received by the femto device from a femto gateway and being received by the femto gateway from the MME,
the information identifying the second resource blocks being received based on the request, and
the second resource blocks not being utilized by the femto device
while the device remains within the femtocell, and
maintain the connection with the macrocell via the second resource blocks identified in the information identifying the second resource blocks,
the connection with the macrocell being maintained by the device based on the second resource blocks while the device remains within the femtocell.

9. The device of claim 8, where the device comprises a user equipment (UE).

10. The device of claim 8, where the second resource blocks include at least one of:
particular time slots that the device may utilize to maintain the connection with the macrocell while the device remains in the femtocell,
particular frequency slots that the device may utilize to maintain the connection with the macrocell while the device remains in the femtocell,
particular bandwidths that the device may utilize to maintain the connection with the macrocell while the device remains in the femtocell, or
particular bitrates that the device may utilize to maintain the connection with the macrocell while the device remains in the femtocell.

11. The device of claim 8, where the processor is further to:
utilize the first resource blocks to maintain the connection with the macrocell when the device no longer detects the presence of the femtocell.

12. A mobility management entity (MME) comprising:
a processor to:
connect with a user equipment (UE) via a macrocell associated with the device,
receive a request from the UE when the UE detects a presence of a femtocell that utilizes same first resource blocks that the UE uses for a connection of the UE with the macrocell,
determine, based on the request, to allocate second resource blocks to the UE for the UE to maintain the connection of the UE with the macrocell while the UE is within the femtocell,
provide, to a femto gateway, information identifying the second resource blocks,
the femto gateway providing the information identifying the second resource blocks to a femto device associated with the femtocell, the femto device providing the information identifying the second resource blocks to the UE, and the second resource blocks not being utilized by the femto device while the device is within the femtocell, and maintain the connection of the UE with the macrocell via the second resource blocks while the UE is within the femtocell.

13. The MME of claim 12, where the second resource blocks include at least one of:

particular time slots that the UE may utilize to maintain the connection with the macrocell while the UE remains in the femtocell, particular frequency slots that the UE may utilize to maintain the connection with the macrocell while the UE remains in the femtocell, particular bandwidths that the UE may utilize to maintain the connection with the macrocell while the UE remains in the femtocell, or particular bitrates that the UE may utilize to maintain the connection with the macrocell while the UE remains in the femtocell.

14. The MME of claim 12, where the information identifying the second resource blocks is provided to the femto device via at least one of:

a Session Initiation Protocol (SIP) over the air (OTA) message, an X2 link message, or an Internet protocol (IP) link on the control plane message.

15. A non-transitory computer-readable medium storing instructions, the instructions comprising:

one or more instructions that, when executed by at least one processor of a device, cause the at least one processor to:

detect a presence of a femtocell;

determine that the device is able to lose a connection with a macrocell due to the femtocell using same first resource blocks that are utilized by the device for the connection with the macrocell;

provide a request for second resource blocks to a mobility management entity (MME) associated with the macrocell based on determining that the device is able to lose the connection with the macrocell;

receive, from a femto device associated with the femtocell, information identifying the second resource blocks that are, the information identifying the second resource blocks being provided from the MME to a femto gateway and from the femto gateway to the femto device, and the second resource blocks not being utilized by the femto device while the device remains within the femtocell; and maintain the connection with the macrocell based on the second resource blocks while the device remains within the femtocell.

16. The non-transitory computer-readable medium of claim 15, where the second resource blocks include one or more of:

particular time slots, particular frequency slots, particular bandwidths, or particular bitrates.

17. The non-transitory computer-readable medium of claim 15, where the instructions further comprise:

one or more instructions that, when executed by the at least one processor, cause the at least one processor to:

maintain the connection with the macrocell by using the first resource blocks after the device leaves the femtocell.

* * * * *